_United States Patent_ [19]

Cole et al.

[11] Patent Number: 5,720,570
[45] Date of Patent: Feb. 24, 1998

[54] DENTAL CHAIR ATTACHMENT

[75] Inventors: David R. Cole, Beaverton; Richard J. Cross, Newberg, both of Oreg.

[73] Assignee: Lite Specialty Metal Works, Inc., Tualatin, Oreg.

[21] Appl. No.: 580,163

[22] Filed: Dec. 28, 1995

[51] Int. Cl.⁶ .................................................. F16B 2/02
[52] U.S. Cl. .......................... 403/256; 403/258; 403/362; 403/164; 248/291.1
[58] Field of Search .................................... 403/362, 370, 403/365, 366, 367, 326, 230, 234, 256, 258, 110, 164, 12; 248/278.1, 291.1, 284.1; 256/65, 68, 67, 69

[56] References Cited

U.S. PATENT DOCUMENTS

| | | | |
|---|---|---|---|
| 2,503,738 | 4/1950 | Horton | 403/362 |
| 3,031,202 | 4/1962 | Melton et al. | 403/164 X |
| 3,237,976 | 3/1966 | Campoli | 403/362 |
| 3,284,114 | 11/1966 | McCord, Jr. et al. | 403/370 |
| 3,460,847 | 8/1969 | Hohwart et al. | 403/362 X |
| 4,436,468 | 3/1984 | Ozaki et al. | 403/362 X |
| 5,163,775 | 11/1992 | Rowan, Jr. | 403/362 X |
| 5,536,104 | 7/1996 | Chen | 403/370 |
| 5,575,580 | 11/1996 | Parrish et al. | 256/65 X |

FOREIGN PATENT DOCUMENTS 1261335  4/1961  France ................................... 403/234

_Primary Examiner_—Harry C. Kim
_Attorney, Agent, or Firm_—Robert L. Harrington

[57] ABSTRACT

A dental chair attachment for supporting an implement such as a light assembly, a hand piece delivery device or other device. The attachment is arranged for the pivotal movement of the implement about a supporting post. The attachment is arranged so that the periphery of the post is not in contact with the pivoting member of the implement. Upper and lower collar bases secured to the post support an inner sleeve that has an internal diameter larger than the diameter of the post. An outer sleeve which supports the pivoting member is rotatively mounted to the inner sleeve. The pivoting member including the outer sleeve, as it pivots, does not contact the periphery of the supporting post. Resilient rings of the upper and lower collar bases are forced radially inward against the periphery of the post to secure the attachment to the post.

4 Claims, 3 Drawing Sheets

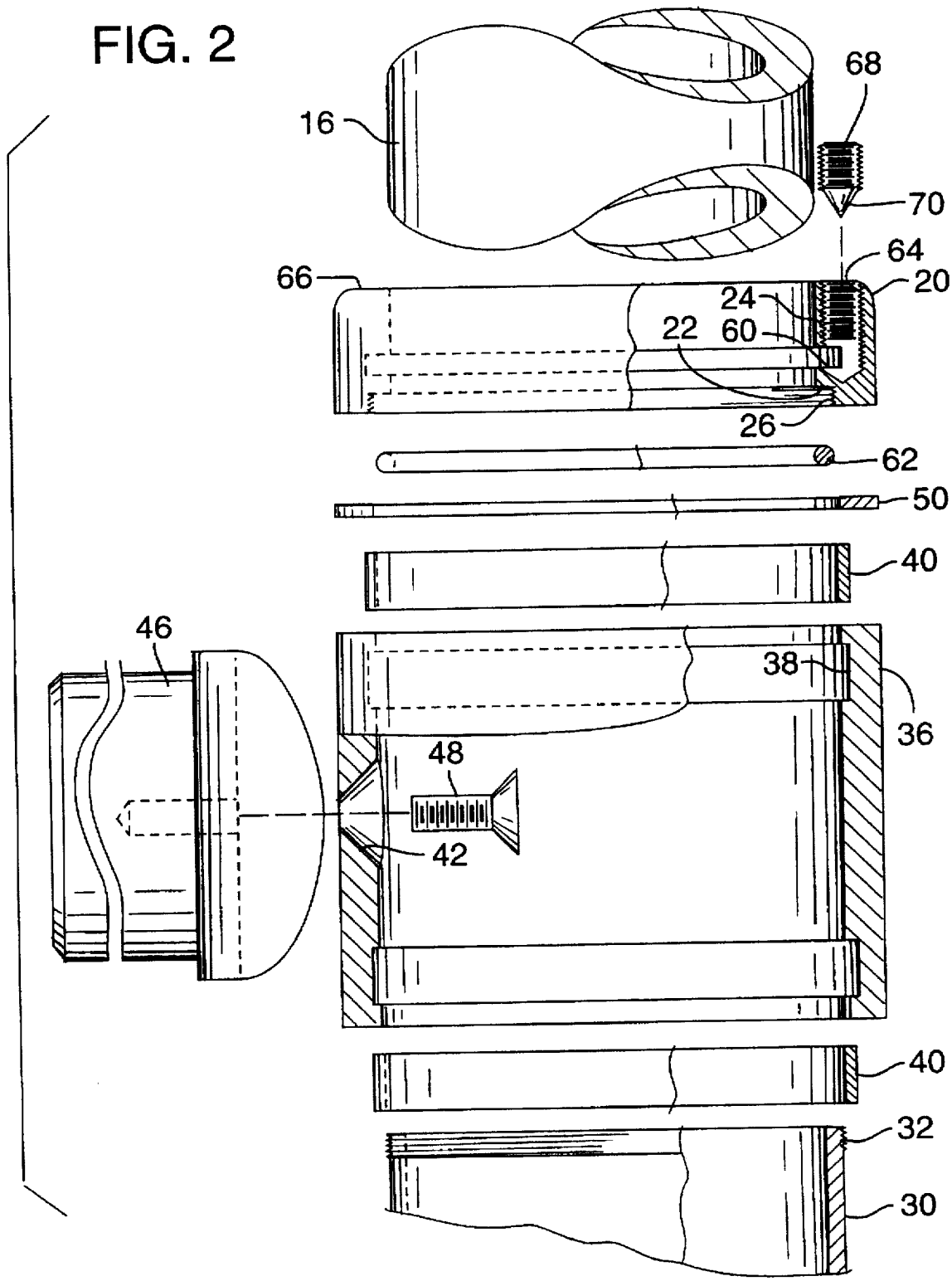

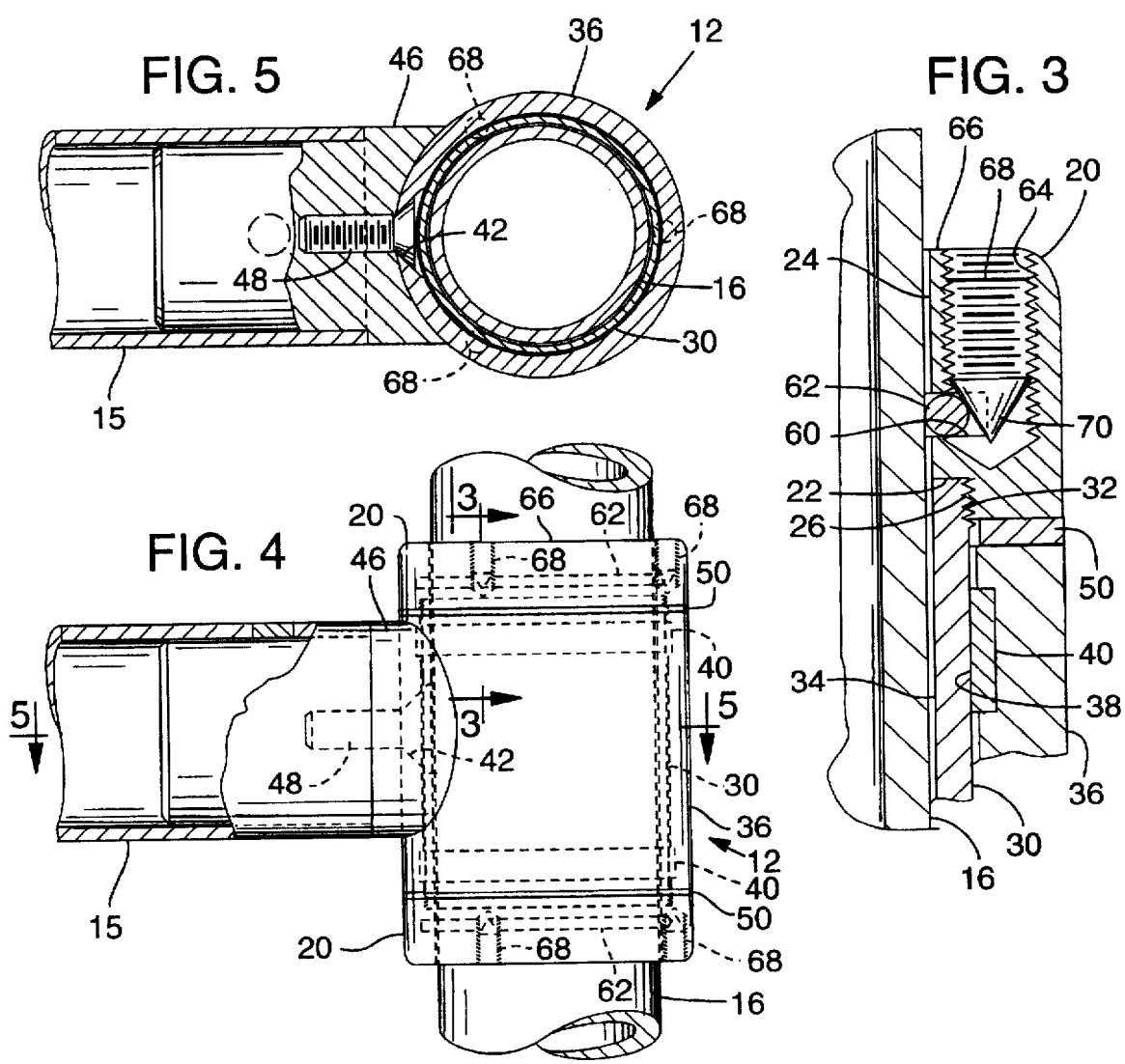

DENTAL CHAIR ATTACHMENT

FIELD OF THE INVENTION

This invention relates to an apparatus providing rotative or pivotal mounting of a working implement to a dental chair with minimal marring of the surface of the dental chair whereat the apparatus is mounted.

BACKGROUND OF THE INVENTION

A dentist's office desirably generates a warm or soft atmosphere for inducing relaxation of the dentist's patients. Whereas steel or chrome surfaces have been common place in a dentist's office in the past, such are viewed to convey a cold or hard atmosphere that induces undesired tension. The trend is to paint or coat such surfaces with what is considered to be soft or warm colors.

The present invention is directed to a mounting apparatus, e.g., for mounting a movable arm carrying a lamp or hand piece delivery head, to a dentist's chair. Typically a post extends upwardly from a support portion of the chair and may carry a movable arm dedicated, e.g., to carrying various instruments such as drills and syringes. An adjustable lamp is an important implement and may be carried by a second movable arm also mounted to the post. The second movable arm may be an add-on item with the post portion extended upwardly through the mounting of the first arm and a rotatable carrier mounted to the post portion which carries the second arm.

One form of the carrier referred to above has a base portion fixedly secured to the post and a sleeve portion surrounding the post and seated on the base portion. A bearing washer provides free rotative sliding of the sleeve portion on the base portion and bearing rings inside the sleeve rotatively slide on the post. Whereas such bearing rings work well against steel or chrome surfaces, they produce unsightly wearing of a painted or coated surface which wearing is preferably prevented.

BRIEF DISCLOSURE OF THE INVENTION

The preferred embodiment of the present invention includes upper and lower base portions. The lower base portion is attached to the post as before. However, the base portion is provided with a threaded upwardly directed shoulder. An inner sleeve member having threaded ends is slipped onto the post and the bottom end is screwed into the threaded shoulder of the lower base portion. An outer sleeve is placed around the inner sleeve and an upper base portion is slipped onto the post. The upper base portion has a downwardly directed threaded shoulder that is threaded onto the upper end of the sleeve. The upper base portion is then fixedly secured to the post. The arm or similar implement is attached to the outer sleeve.

The inner wall of the outer sleeve and the outer wall of the inner sleeve provide bearing surfaces that permit the outer sleeve carrying a second arm to freely rotate around the post without ever contacting the post. The inner sleeve is totally supported by the base portions and is sized to avoid contact with the post surface. Wearing of the paint or surface coating of the post is limited to the manner by which the upper and lower base portions are fixedly attached to the post.

The invention will be more fully appreciated by reference to the following detailed description and the drawings referred to therein.

DESCRIPTION OF THE DRAWINGS

FIG. 2 is an exploded view of the attachment utilized in the dental chair of FIG. 1;

FIG. 3 is a sectional view of a collar base and sleeve;

FIG. 4 is a view showing the attachment assembled on a post of the dental chain of FIG. 1;

FIG. 5 a view as viewed on view lines 5—5 of FIG. 4; and

DESCRIPTION OF THE PREFERRED EMBODIMENT

Figure 1:
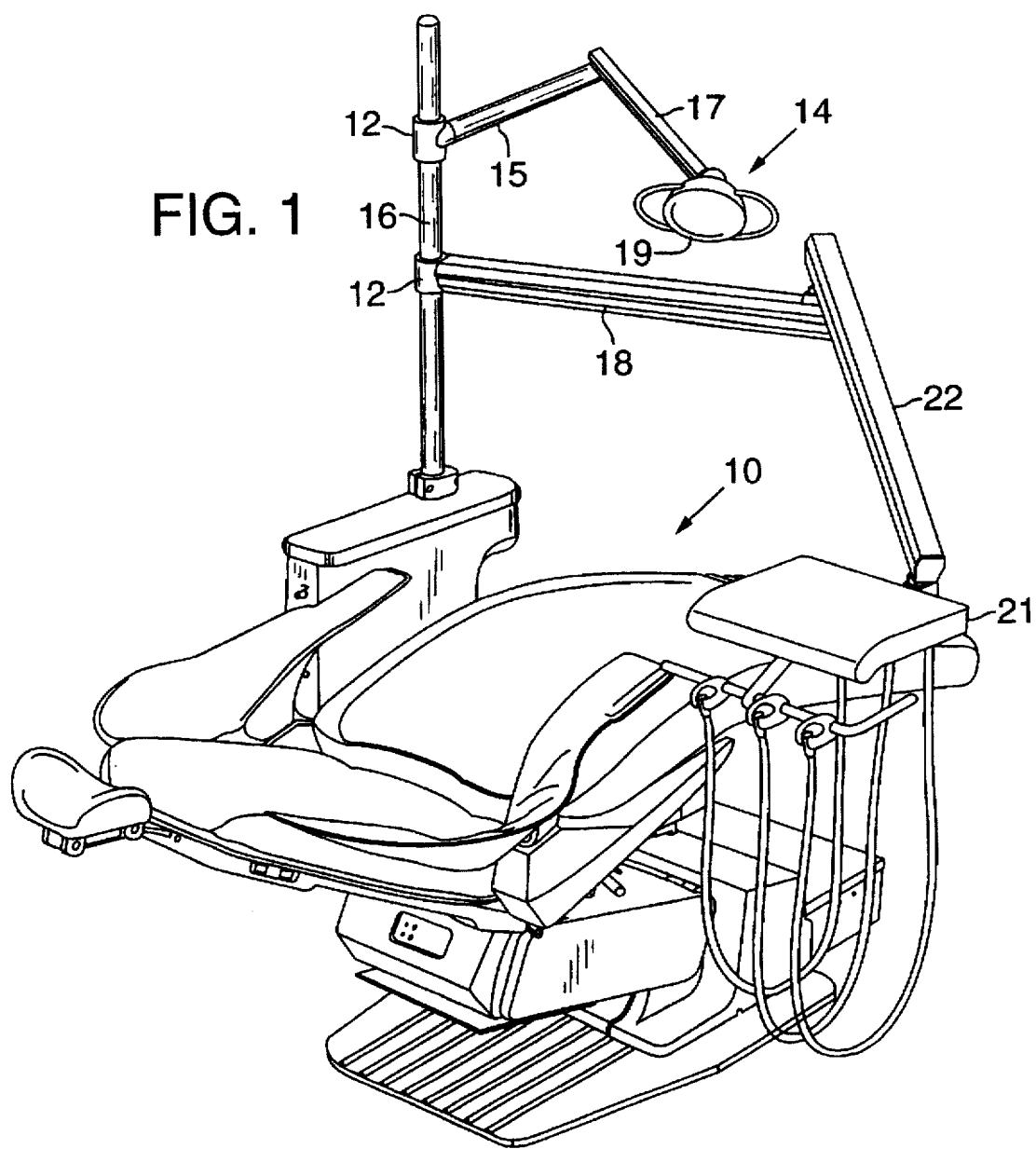
FIG. 1 is a view of a dental chair incorporating the attachment of the present invention.

Refer now to FIG. 1 of the drawings which illustrates a dental chair 10 that utilizes the attachment 12 of the present invention. The attachment 12 in this embodiment supports an implement such as a light assembly 14 or hand piece delivery head 21. The attachment 12 is arranged so that an arm 15 of the light assembly 14 or an arm 18 of the hand piece delivery head 21 may be pivoted about a supporting post 16 without engaging the post. The light assembly 14 may include a second arm 17 and hand piece delivery head 21 may include a second arm 22 that is pivotally and rotatively mounted to the arms 15 or 18.

The attachment 12 is arranged to be mounted to the post 16 without marring the surface finish of the post 16. The attachment 12 permits the arms 15 or 18 of the light assembly 14 or hand piece delivery head 21 to be pivoted about the post 16 without any portion of the light attachment 14 or hand piece delivery head 21 coming into contact with the periphery of the post 16 and thus pivoting of the light assembly 14 or hand piece delivery head 21 will not mar the post 16.

FIG. 2 illustrates the attachment 12 in exploded view and FIG. 4 illustrates the attachment 12 as assembled in relation to the supporting post 16 of the chair 10 of FIG. 1. The attachment 12 has upper and lower ring like collar bases 20 that have through bores 24. Only the upper collar base 20 is illustrated in FIG. 2 with both being illustrated in FIG. 4. The bores 24 of the collar bases 20 have a diameter greater than the diameter of the post 16 and will readily slide over the post 16.

The collar bases 20 have a clamping mechanism for clamping the collar base 20 to the post 16. Referring also to FIG. 3, the upper and lower collar bases 20 have an internal groove 60 in their bores 24 that are arranged to receive a resilient ring 62. The upper and lower collar bases 20 have three bores 64 positioned around their periphery and extending from the upper edge 66 down to the groove 60. The bores 64 are threaded to receive a threaded screw 68 that has a tapered end 70. As seen in FIG. 3, the tapered end 70 of the screw 68 will engage the ring 62 as the screw 68 is rotated inwardly and thus will force the ring 62 to move radially inward toward the post 16 to lock the collar base 20 against the post 16.

Figure 6:
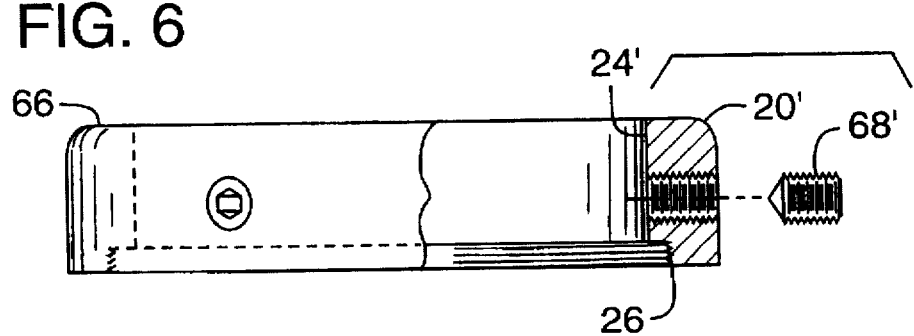
FIG. 6 a view of an alternate collar base.

An alternate collar base 20 is illustrated in FIG. 6. The collar base 20' has three bores 64' positioned around the periphery which extend from the side edge 65 into the bore 24', the bores 64' are threaded to receive a screw 68'. As the screws 68' are rotated inwardly, the end 70' of the screw 68' will engage the post 16 to lock the collar base 20' to the post 16. Rotating the screws 68' outwardly will unlock the collar base 20' from the post 16. Whereas the screw connection of FIG. 6 will minimally mar the surface, the ring connections of FIGS. 2 and 3 are preferred.

Referring again to FIGS. 2–4, the upper and lower collar bases 20 have a shoulder 22 adjacent their interior bores 24. The shoulder portion 22 of the collar bases 20 have internal threads 26. A sleeve 30 which has an internal diameter 34 that is greater than the diameter of the post 16 is configured to fit into the upper and lower collar bases 20. (Particularly note the interfit in FIG. 3.) The sleeve 30 has threads 32 formed at each of its ends that will mate with the internal threads 26 of the upper and lower collar base 20.

The attachment 12 includes an outer sleeve 36 that is sized to fit over the sleeve 30. The outer sleeve 36 has internal grooves 38 arranged to receive bearing strips 40. (Again note FIG. 3.) A counter sunk bore 42 (FIGS. 2 and 4) is provided in the side wall of the outer sleeve 36 to facilitate mounting an adapter 46 to the outer sleeve 36. As seen in FIG. 5, the adapter 46 has a contour that conforms to the cylindrical outer sleeve 36. The adapter 46 is secured to the sleeve 36 by a bolt 48. In this embodiment, the adapter 46 supports an arm 15 of the light assembly 14. The arm 15 is mounted to the adapter 46 by conventional methods, such as by welding.

Thrust washers 50 are provided to reside between the upper collar base 20 and the outer sleeve 36 and the lower collar base 20 and the outer sleeve 36. Refer to FIGS. 4 and 5 of the drawings in conjunction with FIG. 3 which illustrates the attachment 12 assembled and installed on the post 16.

One manner of assembly is as follows. The sleeve 30 is threadably installed in the lower collar base 20. The lower collar base 20 and the sleeve 30 are mounted on the post 16 with the lower collar base 20 and the sleeve 30 surrounding the post 16. The lower collar base 20 and the sleeve 30 are moved to a desired position. The set screws 68 in the lower collar base 20 are screwed inwardly into the bores 64 to force the ring 62 radially inward against the outer periphery of the post 16. This will lock the lower collar base 20 to the post 16.

The adapter 46 is mounted to the outer sleeve 36 by the bolt 48. The adapter 46 in this embodiment includes an extension arm 15 of the light assembly 14. A thrust washer 50 is fitted over the sleeve 30 and is placed in abutment with the lower collar base 20. The bearing strips 40 are inserted into the grooves 38 of the outer sleeve 36. The outer sleeve 36 with the bearing strips 40 installed in the grooves 38 is then slid over the sleeve 30 and will come into contact with the thrust washer 50. Another thrust washer 50 is then installed on top of the outer sleeve 36 and will surround the sleeve 30. The upper collar base 20 is then slid over the post 16 and is threadably installed on the sleeve 30. When the upper collar base 20 is secured to the sleeve 30, the screws 68 of the upper collar base 20 are rotated inwardly to force its ring 62 radially inward against the outer periphery of the post 16. The attachment 12 is thus installed on the post 16 and is secured in position by the rings 62 of the lower and upper collar bases 20 engaging the periphery of the post 16.

It will be appreciated that the adapter 46, the outer sleeve 36, the bearing strips 40, the sleeve 30, the thrust washers 40 and the collar bases 20 may be pre-assembled prior to the installation of the assembly on the post 16. The assembly is simply slid over the post 16 with the upper and lower collar bases 20 and the sleeve 30 surrounding the post 16. When the assembly is in the desired position on the post 16, the rings 62 of the upper and lower collar bases are forced radially inward by the screws 68 to engage the periphery of the post 16 to lock the assembly in position.

The outer sleeve 36 and the adapter 46 attached to the outer sleeve 36 may thus be rotated (pivoted) about the post 16 without contacting the post 16. The sleeve 30 is held fixedly relative to the post 16 and the outer sleeve 36 will rotate about the sleeve 30 on the bearing strips 40.

Should the attachment 12 require adjustment upwardly or downwardly on the post 16, the screws 68 of the upper and lower collar bases 20 are screwed outwardly which permits the rings 62 to move back into the groove 60 and thus release their grip on the post 16. The attachment 12 and any items attached thereto may thus be moved upwardly or downwardly to a desired position. To lock in position, the screws 68 are once again screwed inwardly to force the ring 62 inwardly against the periphery of the post 16.

Those skilled in the art will recognize that modifications and variations may be made without departing from the true spirit and scope of the invention. The invention is therefore not to be determined from the embodiments described and illustrated, but is to be determined from the appended claims.

What is claimed is:

1. A dental chair attachment comprising:
   a cylindrical post;
   a lower base portion and an upper base portion, said base portions fixedly secured to the cylindrical post in a spaced apart relation;
   an inner sleeve and an outer sleeve, said inner sleeve having ends and each of said base portions having a shoulder, which shoulders are threaded and the ends of the inner sleeve are cooperatively threaded with one end of the inner sleeve screwed onto the shoulder of the lower base portion and the other end of the inner sleeve screwed onto the shoulder of the upper base portion, to provide support of the inner sleeve between said base portions with the base portions secured to the post and the inner sleeve not in contact with the post, said outer sleeve surrounding said inner sleeve whereby the outer sleeve is supported by the base portions and inner sleeve and rotates on said inner sleeve around the post, said outer sleeve configured to carry an arm of an implement.

2. A dental chair attachment as defined in claim 1 wherein:
   the base portions include resilient clamping rings having radial movement toward the post, screws projected into the base portion at the periphery of the rings, said screws engaging and forcing the clamping rings radially inwardly whereby the rings are forced into clamping engagement with the post.

3. A dental chair attachment as defined in claim 2 wherein the implement carried by the arm is a lamp, said arm being articulated for both radial and rotative movement of the implement.

4. A dental chair attachment as defined in claim 1 wherein the base portions have threaded through bores and screws threadably engaged with the threaded through bores are manipulated to secure the base portions to the post.

* * * * *